United States Patent [19]
Brenner et al.

[11] Patent Number: 5,806,200
[45] Date of Patent: Sep. 15, 1998

[54] PROBE HEAD OF A COORDINATE MEASURING APPARATUS

[75] Inventors: Kurt Brenner, Satteldorf; Peter Ähnelt, Oberkochen; Roland Roth, Waldstetten; Karl Seitz, Oberkochen, all of Germany

[73] Assignee: Carl-Zeiss-Stiftung, Heidenheim, Germany

[21] Appl. No.: 794,547

[22] Filed: Feb. 3, 1997

[30] Foreign Application Priority Data

Jul. 18, 1996 [DE] Germany .................. 296 12 475 U

[51] Int. Cl.⁶ ..................... G01B 5/016; G01B 5/012
[52] U.S. Cl. ................................. 33/559; 33/556
[58] Field of Search ................. 33/559, 560, 561, 33/556, 557, 558, 503

[56] References Cited

U.S. PATENT DOCUMENTS

| | | | |
|---|---|---|---|
| 4,360,973 | 11/1982 | McMurtry | 33/561 |
| 4,375,723 | 3/1983 | McMurtry | 33/559 |
| 5,113,593 | 5/1992 | Cusack | 33/559 |
| 5,121,551 | 6/1992 | Linder et al. | 33/559 |
| 5,396,712 | 3/1995 | Herzog . | |

FOREIGN PATENT DOCUMENTS 4100396  7/1992  Germany .

*Primary Examiner*—Christopher W. Fulton
*Attorney, Agent, or Firm*—Walter Ottesen

[57] ABSTRACT

The invention is directed to a probe head of a coordinate measuring apparatus for conducting measurements on a workpiece. The probe head has a first longitudinal axis and has a probe pin mounted on the probe head. The probe pin has a second longitudinal axis defining an angle with the first longitudinal axis. A joint-free, rigidly-configured adjusting device adjusts this angle when the probe pin is not in contact with the workpiece.

10 Claims, 2 Drawing Sheets

PROBE HEAD OF A COORDINATE MEASURING APPARATUS

FIELD OF THE INVENTION

The invention relates to a probe head of a coordinate measuring apparatus for holding a probe pin with which the workpiece to be measured is contacted. The probe head includes an adjusting device with which the angle between the longitudinal axis of the probe pin and the longitudinal axis of the probe head can be changed when the probe pin is in the non-contacting position.

BACKGROUND OF THE INVENTION

Probe heads, which are adjustable in this manner, have been known for some time and are needed in order to precisely align the probe pins held thereon. Such an alignment is especially necessary for probe pins in the form of so-called disc probes. Disc probes are usually used for measurements of relief grooves or undercuts in bores. Disc probes include a disc and this disc must be precisely horizontally aligned for exact measurement of a workpiece in the vertical direction (Z direction).

Such a probe head with an adjusting device is disclosed, for example, in German patent publication 4,100,396. The probe head shown here includes a probe tip which is attached to a probe pin holder of the probe head. The probe pin holder, in turn, is accommodated in a bore of a sphere. The sphere is articulately journalled in the probe head so that the probe pin can be deflected. A relatively complex mechanical device is provided on the movable probe pin holder in the probe head. When contacting a workpiece to be measured, the probe deflection from a fixed zero position is measured utilizing this mechanical device. The zero position can be changed via the adjusting device integrated into the mechanical device.

The probe head described in German patent publication 4,100,396 is provided especially for measuring systems wherein the probe pin is machine controlled for placement on the workpiece to be measured. For this purpose, the probe pin must be deflectable so that it will not be destroyed when there is an erroneous contact. The adjustment is therefore relatively complex. Furthermore, hysteresis effects occur which are caused by the friction of the ball on the probe head when the probe pin deflects.

Recently, handheld apparatus have become known wherein the probe pin must not be deflected with respect to the probe head because the probe pin is placed manually on the workpiece to be measured.

SUMMARY OF THE INVENTION

It is an object of the invention to provide a probe head which is easy to manufacture and has an adjusting device and which can be utilized for such a handheld coordinate measuring apparatus.

The probe head of a coordinate measuring apparatus is for conducting measurements on a workpiece. The probe head has a first longitudinal axis and includes: a probe pin mounted on the probe head having a second longitudinal axis defining an angle with the first longitudinal axis; and, a joint-free, rigidly-configured adjusting device for adjusting the angle when the probe pin is not in contact with the workpiece.

The basic idea of the invention is seen in that the adjusting device is without a joint and is therefore rigidly configured.

In this way, the advantage is afforded that the probe pin can only be moved by bending with respect to the probe head during its intended use so that the above-mentioned friction-conditioned hysteresis effects no longer can occur. Furthermore, the probe head includes only a small number of easily manufactured components which are likewise easy to assemble.

An especially advantageous probe head according to the invention includes as an adjusting device a probe pin holder which mutually connects the probe pin and the probe head without a linkage and therefore rigidly. The probe pin holder is bent in its elastically deformable region for adjusting the probe pin. The probe pin holder can have different configurations and can, for example, be configured so as to be bent or straight. Advantageously, the probe pin holder has a constriction so that the probe pin holder can be advantageously bent at this location. The probe pin holder can also be attached to the probe head in different ways. The probe pin holder can be attached at a so-called probe exchange cone which can be rigidly attached in the probe head or can be attached directly in or on the probe head.

The bending of the probe pin holder is advantageously adjusted by spacer means which adjusts the spacing of the probe pin holder from a body at least partially surrounding the probe pin holder. For example, the body can be a tube which is connected at one end rigidly to the probe pin holder and, at the other end, the spacer means in the form of adjustable screws can be mounted. It is, however, also conceivable that the body can be the probe head itself. The probe pin holder is then attached inside or externally in the upper region of the probe head. Spacers in the form of screws are provided in the lower region of the probe head. These screws fix the spacing of the probe pin holder from the probe head.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
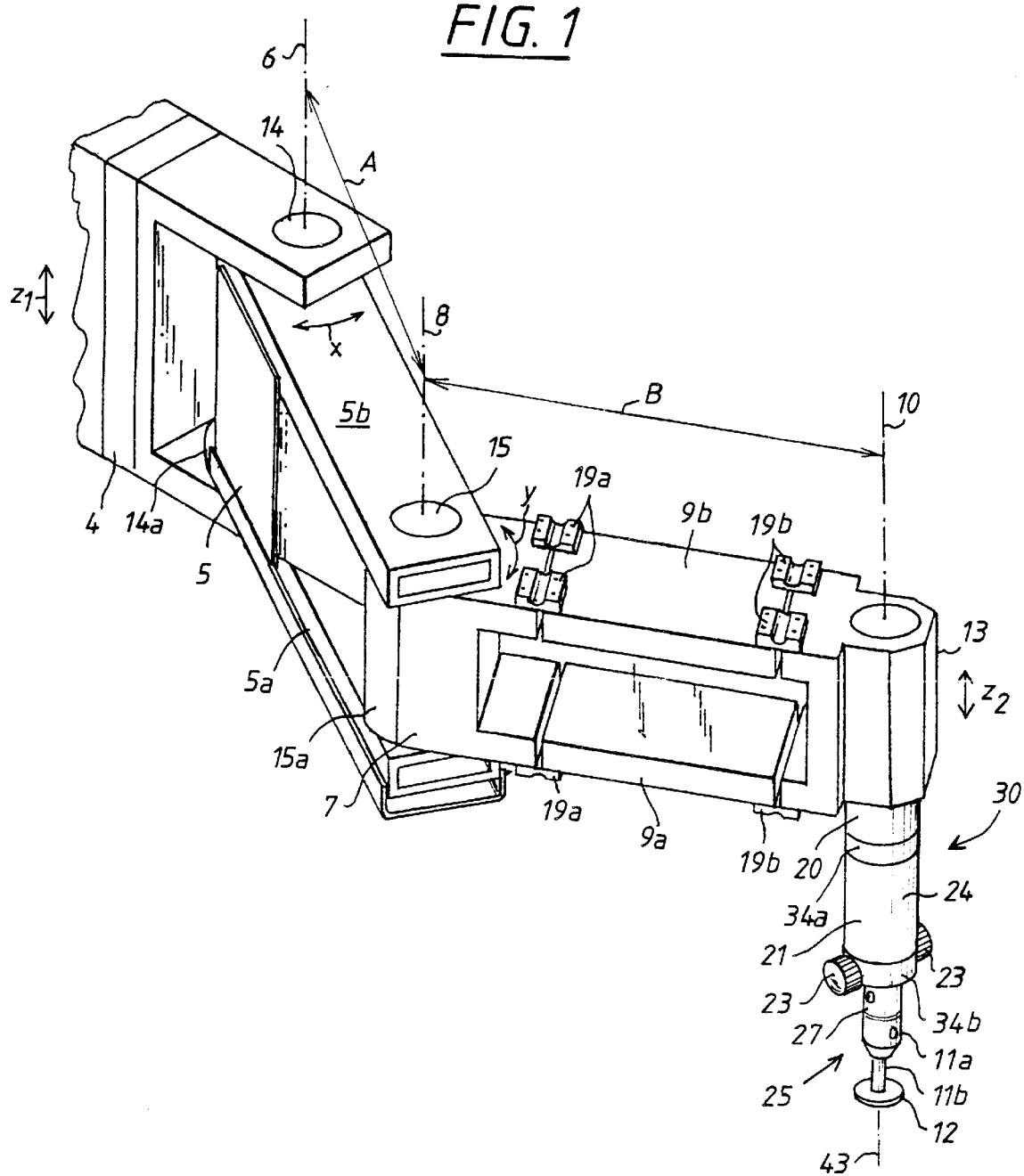
FIG. 1 is a perspective schematic showing the probe arm of a coordinate measuring apparatus equipped with a probe head according to an embodiment of the invention.

With respect to the description of FIG. 1, U.S. Pat. No, 5,396,712 is incorporated herein by reference and shows a coordinate measuring apparatus which is exemplary for the probe arm and probe head shown in FIGS. 1 to 3. In the following, reference is made to the coordinate measuring apparatus shown in U.S. Pat. No. 5,396,712. The machine base of the apparatus and the workpiece table as well as the vertical Z-column are not shown in FIG. 1 but are shown in U. S. Pat. No. 5,396,712.

A fork-shaped carrier 4 is mounted on the vertical Z-column and can be driven motorically to track vertically in the direction of double arrow $Z_1$.

Bearings are provided in both legs of the carrier 4 for a shaft 14 connecting the legs. This shaft 14 defines a first vertical rotational axis 6. A first pivot arm 5 is attached to the shaft 14 so that it can pivot horizontally as indicated by double arrow x. The angular measuring system required to detect the pivot movement is not shown in FIG. 1 for the sake of clarity.

The pivot arm 5 likewise has a fork-shaped configuration. The ends of the legs (5a, 5b) of the fork-shaped pivot arm support the bearings for a second shaft 15. This shaft 15 defines the second rotational axis 8 which is at a spacing A to the first rotational axis 6 and is aligned parallel thereto. A second pivot arm 7 is attached to the shaft 15 and is rotatable about the axis 8 as indicated by double arrow y.

This second pivot arm 7 comprises three parts and is configured in the form of a spring parallelogram in order to be able to manually deflect the probe head 30 for the probe pin 25 of the apparatus in the vertical direction as indicated by double arrow $Z_2$. The probe head 30 includes a holder 13, a probe exchange cone 20 and a carrier tube 24 as well as a probe pin holder 27 mounted in the carrier tube 24. The probe exchange cone 20 is fixedly anchored in the holder 13 and can, as required, be removed therefrom. A probe tube 24 is provided on the lower end of the probe exchange cone 20. The probe tube 24 has a probe pin holder 27 mounted therein. The probe pin 25 is attached to the probe pin holder 27.

The spring parallelogram is realized by two parallelly arranged legs (9a, 9b). Each of the legs has a first end provided with a pair of joint springs 19a which connect the first end to a leg of the part 7a and a second end which is provided with a further pair of joint springs 19b for connection to one of the two ends of the holder 13. The part 7a is located between the legs 5a and 5b of the first pivot arm 5 and is journalled on the shaft 15.

With the coordinate measuring apparatus described above, workpieces can be measured in that the holder 13 and therefore the disc 12 are moved manually and the coordinates of the probe pin are determined via the measuring devices. More specifically, the disc 12 is moved by hand on the surface of the workpiece (not shown) to be measured. Especially relief grooves and backcuts in bores of the workpiece can be measured with the disc 12 of the probe in that the disc 12 is lowered vertically into the bore. Then, the disc can be guided in the vertical direction in the corresponding relief grooves and backcuts of the bore. A sensor responds when the spring parallelogram having legs (9a, 9b) is manually deflected in the direction of arrow $Z_2$. The sensor ensures that the carrier 4 tracks the deflection movement via a drive (not shown) as symbolized by double arrow $Z_1$. The measurement in the vertical direction is then carried out by a sensor (not shown) on the vertical Z-column of the machine base. For precise measurements of the workpiece to be measured, the disc 12 of the probe must be adjusted precisely horizontally. For this purpose, the probe head 30 includes an adjusting device which is described in detail with reference to FIG. 2.

Figure 2:
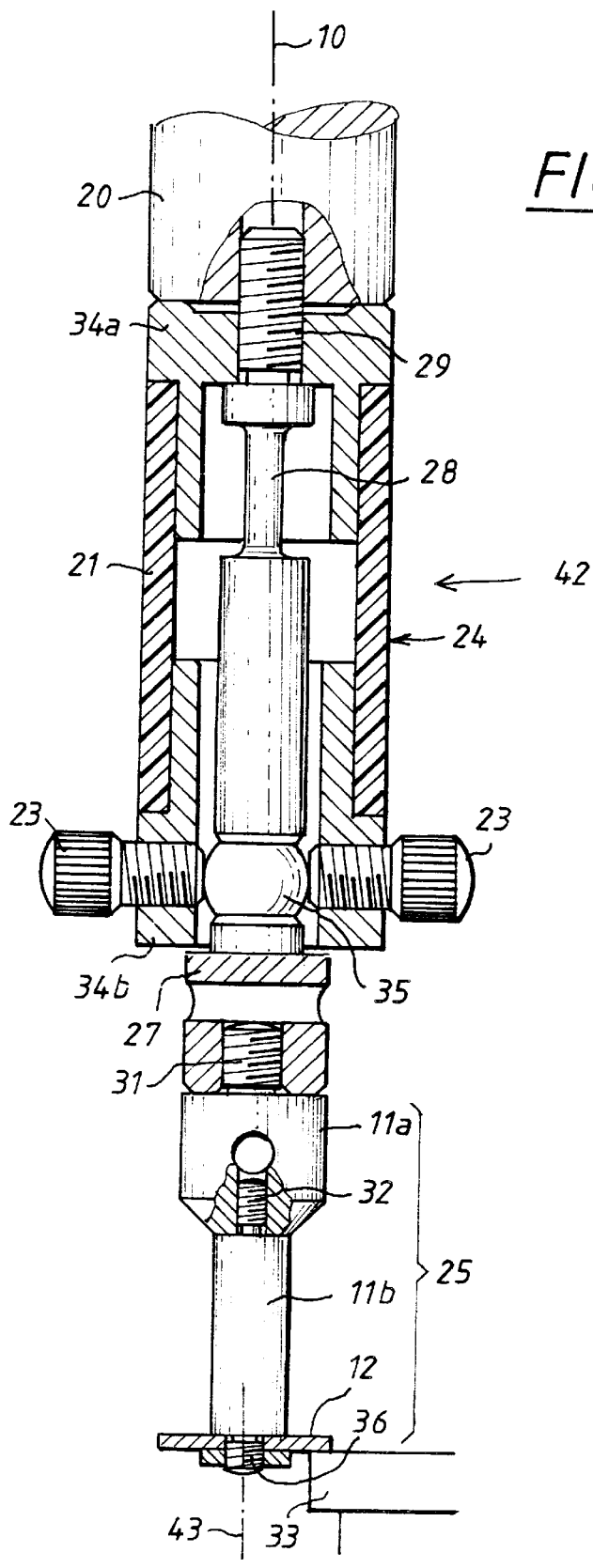
FIG. 2 is a detail view, in section, of the probe head of FIG. 1.

FIG. 2 shows a detail, in section, of the probe head 30 of FIG. 1. The probe head has an adjusting device 42 with which the angle between the longitudinal axis of the probe pin 25 and the longitudinal axis of the probe head 30 can be adjusted. The adjustment is made when there is no contact with the workpiece. The adjusting device 42 is free of joints and is therefore rigidly configured.

The adjusting device 42 includes a probe pin holder 27, a body at least partially surrounding the probe pin holder and at least one spacer means. The body is in the form of a probe tube 24 and the spacer means is in the form of screws 23 which fix the spacing of the probe pin holder 27 from the probe tube 24. In addition to the two screws 23 shown, two additional screws are provided and are positioned orthogonally to the screws 23 and are therefore not shown in FIG. 2.

The function of the above-described adjusting device is described below.

The probe pin holder 27 is bent in its elastic deformable region 28 by adjusting the screws 23 so that the angle between the longitudinal axis 43 of the probe pin 25 and the longitudinal axis 10 of the probe head 34 is changed. The probe pin 25 shown is in the form of a disc probe and can be adjusted by displacing the screws 23 until the disc 12 is completely aligned horizontally. A calibrating standard 33 can be provided as shown for the alignment. The disc 12 is aligned plane parallel to this calibrating standard 33. The extent of the accuracy to which the workpiece can be measured is dependent upon the precise alignment of the disc 12.

The probe pin holder 27 preferably has a constriction 28 which preferably can be bent in order to reduce the forces of the screws 23 on the probe pin holder.

Furthermore, a spherical bearing surface 35 is provided on the probe pin holder 27 which ensures that the screws always lie perpendicularly to the probe pin holder 27 when bending the probe pin holder.

The condition can be prevented that the tube 24 becomes displaced relative to the probe pin holder 27 because of temperature differences which would otherwise cause the disc 12 to come out of alignment. For this reason, the probe tube 24 and the probe pin holder 27 are so configured that they have the same thermal expansion coefficient.

The thermal expansion coefficient should be as low as possible so that the temperature fluctuations during measurements change the length of the probe tube 24 and of the probe pin holder 27 as little as possible. For this purpose, the probe tube 24 has essentially two end pieces (34a, 34b) which are each rotationally symmetrical and are made of aluminum. The end pieces (34a, 34b) are joined to each other by synthetic-resin bonded carbon fiber structure 21. The production of the probe tube takes place in a winding process. The fiber direction of the carbon fibers is optimized in such a manner that maximum bending stiffness results for desired thermal longitudinal expansion. The end pieces (34a, 34b) are cemented to the carbon fiber tube in a special cementing process.

The probe pin holder 27 is made of Invar. The assembly is so configured that the aluminum end pieces (34a, 34b) greatly expand when heated; whereas, the carbon fibers 21 pull together. The carbon fibers 21 and the aluminum end pieces (34a, 34b) are so dimensioned that the resulting expansion corresponds to the expansion of the probe pin holder 27.

The adjusting device 42 or the probe pin holder of the adjusting device 42 is, on the one hand, equipped with an internal thread 31 in which the probe pin 25 threadably engages and with an outer thread 29 with which the adjusting device 42 is screwed tightly onto the probe exchange cone 20. The probe exchange cone 20 is anchored in the holder 13 as shown in FIG. 1.

The probe pin 25 comprises an adapter piece 11a having an internal thread in which a pin 11b threadably engages. A thread 36 is provided at the other end of the pin 11b on which the disc 12 is located. The disc 12 is fixed with a nut 12a.

Figure 3:
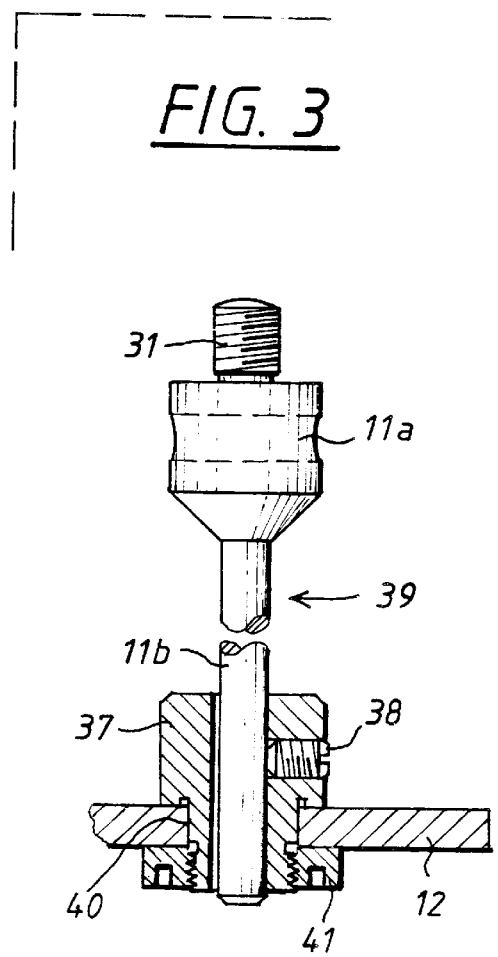
FIG. 3 is a section view taken through a probe pin for the probe head according to the invention.

FIG. 3 shows another embodiment of the probe pin 39 which can be seated in the probe pin holder 27 in lieu of probe pin 25. The probe pin 39 differs from the probe pin 25 essentially in that a disc holder 37 is provided which is secured via a set screw 38. The disc holder 37 holds the disc 12. The disc is held by the disc holder in that the disc is seated on a cylinder provided in the disc holder and is secured with a nut 41 on a thread likewise located in the disc holder 37.

It is noted that the embodiments shown in FIGS. 1 to 3 are not drawn to scale and that not all details are shown, such as electric components et cetera. Furthermore, the invention is not limited to the embodiments shown. Accordingly, the probe pin holder 27 can also be mounted in or on the holder 13. The screws 23 must then be provided in the holder 13. The probe can also be different and can, for example, also be a conventional spherical probe. The materials can also vary. For example, plastic can be used in lieu of metal.

It is understood that the foregoing description is that of the preferred embodiments of the invention and that various changes and modifications may be made thereto without departing from the spirit and scope of the invention as defined in the appended claims.

What is claimed is:

1. A probe head of a coordinate measuring apparatus for conducting measurements on a workpiece, the probe head having a first longitudinal axis and comprising:

a probe pin mounted on said probe head having a second longitudinal axis defining an angle with said first longitudinal axis; and, a joint-free, rigidly-configured adjusting device for adjusting said angle when said probe pin is not in contact with said workpiece.

2. The probe head of claim 1, said adjusting device including:

a probe pin holder for rigidly connecting said probe pin and said probe head to each other;

said probe pin holder having an elastic deformable region; and, means for operating on said probe pin holder for bending the same to adjust said angle.

3. The probe head of claim 2, said elastic deformable region being a constriction formed in said probe pin holder.

4. The probe head of claim 3, further comprising a body at least partially surrounding said probe pin holder; and, said operating means including at least one adjustable spacing element for adjusting the spacing of said probe pin holder relative to said body.

5. The probe head of claim 4, said body being a probe tube having a first end for holding said probe pin holder and a second end for holding said adjustable spacing element.

6. The probe head of claim 5, said probe pin holder and said probe tube being configured to have the same thermal expansion coefficient.

7. The probe head of claim 6, said thermal expansion coefficient being as low as possible.

8. The probe head of claim 5, said first and second ends of said probe tube being defined by first and second metal end pieces; and, said probe tube including a carbon fiber enclosure interconnecting said first and second metal end pieces.

9. The probe head of claim 1, said probe pin being a disc probe.

10. A coordinate measuring apparatus for conducting measurements on a workpiece, the coordinate measuring apparatus comprising:

a measuring arm pivotally journalled about at least a pivot axis and being movable in the direction of said pivot axis;

a probe head mounted on said measuring arm and having a first longitudinal axis;

a probe pin mounted on said probe head having a second longitudinal axis defining an angle with said first longitudinal axis; and, a joint-free and rigidly-configured adjusting device for adjusting said angle when said probe pin is not in contact with said workpiece.

* * * * *